Sept. 13, 1932.  C. A. ADAMS  1,876,534
BEARING ADAPTER
Filed May 29, 1931
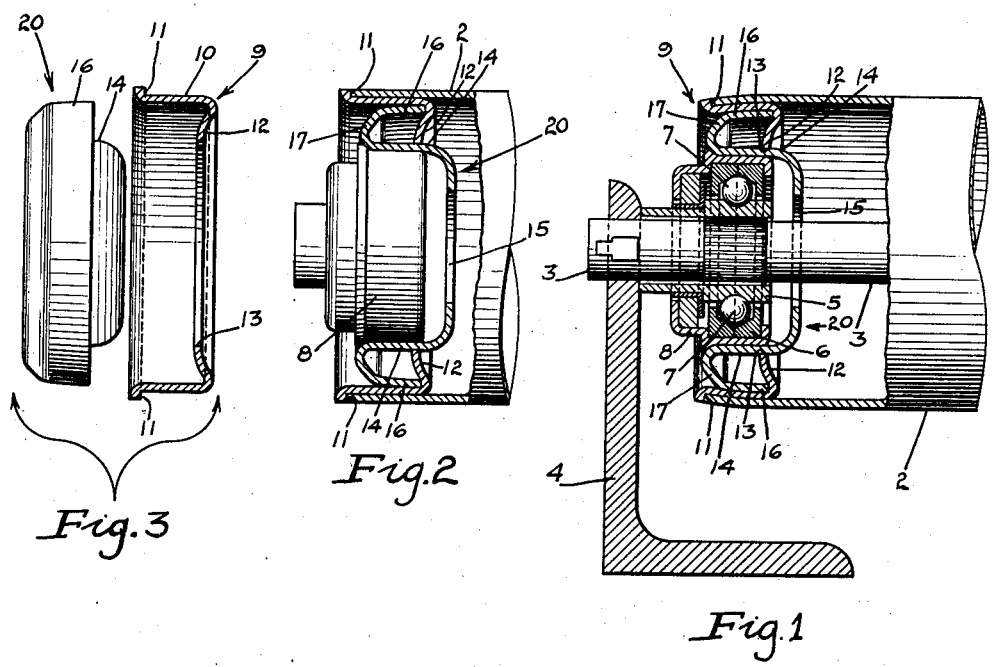
INVENTOR
CHARLES A. ADAMS
ATTORNEYS Patented Sept. 13, 1932

1,876,534

UNITED STATES PATENT OFFICE

CHARLES ATWOOD ADAMS, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

BEARING ADAPTER

Application filed May 29, 1931. Serial No. 540,983.

This invention relates to new and useful improvements in bearing adapters and more particularly to such a device adapted for use in connection with tubular gravity carrier rollers.

An object of the invention is to provide an adapter comprising a head adapted to be fitted into the end of a tubular roller and having an annular shoulder adapted to abuttingly engage the end of said roller, said head also having an inwardly turned flange provided with an axial bore, and a member having a cup-shaped portion fitting in said bore and adapted to receive a bearing cage, said member also having a web portion fitting within said head and engaging the inwardly turned flange thereof.

A further object is to provide a bearing adapter comprising two parts, one part having a portion adapted to be fitted into the end of a tubular member or roller, and the other part fitting within said first mentioned part and having a seat therein adapted to receive a bearing cage, said parts being secured in position within the roller by contracting the end of said roller.

A further object is to provide in combination with a tubular gravity carrier roller, an adapter adapted to be fitted into the end of said roller, whereby a bearing cage of relatively smaller diameter than the inside diameter of said roller may be axially secured in said roller, said adapter comprising a head formed to fit into one end of the roller and having an annular shoulder adapted to abuttingly engage the end of said roller to limit the inward movement of said head, and a member having a portion fitting within said head and provided with a socket adapted to receive a bearing cage, said head and member being arranged to be interlocked in fixed relation by inwardly bending or contracting the end of said roller.

A further object is to provide a bearing adapter of simple and inexpensive construction, whereby a bearing of relatively small diameter may be fitted into a tubular roller whose diameter is considerably greater than the diameter of said bearing, and said adapter comprising two parts nested together to provide a very substantial and rugged support for the bearing within said roller, and means for fixedly securing said adapter in position in the end of the roller.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

In the drawing;

Figure 1 is a detail sectional view showing one end of a gravity carrier roller, and the invention embodied in the construction thereof;

Figure 2 is a detail sectional view showing the relative positions of the parts before the end of the roller is contracted to secure the adapter therein; and Figure 3 is a view showing the adapter removed from the roller and the two parts thereof separated.

In the selected embodiment of the invention here shown, there is illustrated, for purposes of disclosure, one end of a tubular gravity carrier roller 2, rotatably mounted upon an axle 3, by means of suitable anti-friction bearings. The axle is non-rotatably supported upon suitable rails 4. The anti-friction bearing here shown comprises an inner cone 5, non-rotatably supported upon the axle 3, and an outer ball race 6 rotatably mounted upon the cone 5 by means of the usual anti-friction elements 7. A bearing cage 8 encloses the ball race 6 and cone 5, as clearly shown in Figure 2.

A feature of the present invention resides in the means provided for supporting the tubular roller 2 upon the bearing cage 8 of the bearing. By reference to Figures 1 and 2, it will be noted that the inside diameter of the roller 2 is considerably greater than the outside diameter of the bearing cage 8, and means are therefore provided for axially supporting the roller 2 upon the bearing cage 8.

The novel adapter featured in this invention comprises two parts. The outer part, which will hereinafter be referred to as the head 9, comprises a cylindrical portion 10 adapted to be snugly fitted into the end of the tubular roller 2, as shown in Figure 2. This cylindrical portion 10 is provided at one end with an annular shoulder 11, formed by outwardly bending the marginal edge of the cylindrical portion 10, as best shown in Figure 3. The shoulder 11 is adapted to abuttingly engage the end of the roller 2 to limit the inward movement of the head, when the latter is fitted into the roller. The head 9, at its opposite end, has an inwardly turned flange 12 which, preferably is shaped as shown in Figure 3 and is provided with an axial bore 13.

The other part of the adapter, which hereinafter will be referred to as the member 20, is provided with a cup-shaped portion 14 adapted to snugly fit into the bore 13 of the head 9, as shown in Figures 1 and 2. The cup-shaped portion 14 is provided with an aperture 15 adapted to be traversed by the axle 3, as shown in Figure 1. The cylindrical wall of the cup-shaped member 14 is bent outwardly and backwardly over said cup-shaped portion to provide an annular flange 16, spaced from the cylindrical wall of the cup-shaped member 14, and connected therewith by a transversely disposed web 17, as clearly illustrated in Figure 2. The annular flange 16 of the member 20 is slightly cone-shaped, as will be noted by reference to Figure 2, so that when the head 9 and member 20 are nested together, as shown in Figure 2, the end of the roller 2 may be contracted or bent inwardly, as shown in Figure 1, whereby the cylindrical portion 10 of the head 9 will be forced into close contact with the periphery of the flange 16, thereby locking the member within the head and also the head within the end of the roller so that the parts cannot become separated.

By thus nesting together the two parts of the adapter and securing them in position within the end of the roller by contracting the end thereof, as above described, a very substantial and rugged construction is provided and, at the same time, one which permits the bearing cage to be readily removed from the inner member 20 of the adapter, if necessary; it being understood that to do so, the axle must, of course, be disengaged from the side rail 4. By constructing the adapter of two parts, as herein described, it is greatly strengthened because of the load being transmitted from the bearing to the roller through the inwardly turned flange 12 of the head 9 and the annular web 17 of the member 20. The head and member are stamped and formed from sheet metal, whereby they may be manufactured at a very small cost and, because of their peculiar construction, they may be quickly assembled and inserted into the end of a roller to be secured therein, resulting in a material saving in labor and cost of manufacture.

I claim as my invention:

1. A bearing adapter comprising a head adapted to be fitted into one end of a tubular roller, said head having means adapted to engage the end of said roller and also having an inwardly turned flange provided with an axial bore, and a member having a cup-shaped portion fitting in said bore and adapted to receive a bearing cage.

2. A bearing adapter comprising a head adapted to be fitted into one end of a tubular roller, said head having an annular shoulder adapted to engage the end of the roller and also having an inwardly turned portion provided with a suitable bore, and a cup-shaped member secured in said head and adapted to receive a bearing cage.

3. A bearing adapter comprising a head adapted to be fitted into one end of a tubular roller, said head having an annular shoulder adapted to abuttingly engage the end of said roller and also having an inwardly turned flange provided with an axial bore, and a member having a cup-shaped portion fitting in said bore and adapted to receive a bearing cage.

4. A bearing adapter comprising a head adapted to be fitted into one end of a tubular roller, said head having an annular shoulder adapted to abuttingly engage the end of said roller and also having an inwardly turned flange provided with an axial bore, a member having a cup-shaped portion fitting in said bore and adapted to receive a bearing cage, said member also having a flange fitting within said head and adapted to engage the inwardly turned flange thereof.

5. A bearing adapter comprising a head formed of sheet metal and provided with a cylindrical portion adapted to be fitted into one end of a tubular member, said cylindrical portion having an annular shoulder at one end thereof and an inwardly turned flange at its opposite end provided with an axial bore, and a member also formed of sheet metal and provided with a cup-shaped portion adapted to be seated in said bore, said member having a portion of its wall bent outwardly and inwardly over said cup-shaped portion to provide an annular flange which is spaced from said cup-shaped portion and connected therewith by a transversely disposed web, said flange engaging the inwardly turned flange of said head.

6. A bearing adapter comprising a head formed of sheet metal and provided with a cylindrical portion adapted to be fitted into one end of a tubular member, said cylindrical member having an annular shoulder at one end thereof and an inwardly turned flange at its opposite end provided with an axial bore, a member also formed of sheet metal and having a cup-shaped portion adapted to be seated in said bore, said member having a portion of its wall bent outwardly and inwardly over said cup-shaped portion to provide an annular flange which is spaced from said cup-shaped portion and connected therewith by a transversely disposed web, said flange being slightly cone-shaped and fitting within the cylindrical portion of said head whereby, when said head and member are nested together and fitted into one end of said roller, and the walls of the roller are contracted, said parts will be inseparably secured together.

In witness whereof, I have hereunto set my hand this 23rd day of May, 1931.

CHARLES ATWOOD ADAMS.